US012800227B2

(12) United States Patent
Von Scheele et al.

(10) Patent No.: US 12,800,227 B2
(45) Date of Patent: Nov. 17, 2026

(54) METHOD FOR HEATING A FURNACE

(71) Applicant: Linde GmbH, Pullach (DE)

(72) Inventors: Joachim Von Scheele, Pullach (DE); Anders Carlsson, Pullach (DE); Eric Frank, Pullach (DE); Mats Jonsson, Pullach (DE)

(73) Assignee: Linde GmbH, Pullach (DE)

( * ) Notice: Subject to any disclaimer, the term of this patent is extended or adjusted under 35 U.S.C. 154(b) by 375 days.

(21) Appl. No.: 18/566,412

(22) PCT Filed: Jun. 2, 2022

(86) PCT No.: PCT/EP2022/025260
§ 371 (c)(1),
(2) Date: Dec. 1, 2023

(87) PCT Pub. No.: WO2022/253468
PCT Pub. Date: Dec. 8, 2022

(65) Prior Publication Data

US 2024/0263881 A1 Aug. 8, 2024

(30) Foreign Application Priority Data

Jun. 2, 2021 (EP) .................................... 21020293

(51) Int. Cl.

| | |
|---|---|
| ***F27B 11/00*** | (2006.01) |
| ***F27B 5/10*** | (2006.01) |
| ***F27D 7/06*** | (2006.01) |
| ***F27D 17/10*** | (2025.01) |
| *F27D 17/13* | (2025.01) |

(52) U.S. Cl.
CPC .............. *F27D 17/10* (2025.01); *F27B 11/00* (2013.01); *F27D 7/06* (2013.01); *F27D 2007/063* (2013.01); *F27D 17/13* (2025.01)

(58) Field of Classification Search
CPC ........ F27B 5/02; F27B 5/14; F27B 2005/143; F27D 17/10; F27D 17/00; F27D 7/06; F27D 2007/063
See application file for complete search history.

(56) References Cited

U.S. PATENT DOCUMENTS

| | | | | |
|---|---|---|---|---|
| 3,733,174 A | | 5/1973 | Yoshimoto | |
| 5,380,378 A | * | 1/1995 | Hemsath .................. | C21D 9/67 266/256 |

(Continued)

FOREIGN PATENT DOCUMENTS

| | | | | |
|---|---|---|---|---|
| CN | 102382973 A | * | 3/2012 | |
| CN | 112066711 A | * | 12/2020 | ................ F27B 5/14 |

(Continued)

*Primary Examiner* — Gregory A Wilson
(74) *Attorney, Agent, or Firm* — Millen, White, Zelano & Branigan, PC; Brion P. Heaney

(57) ABSTRACT

The invention relates to a method for heating a furnace, wherein the furnace comprises an inner chamber and a outer chamber. A process gas is introduced into the inner chamber. A fuel is combusted with an oxidant to produce combustion gases in a combustion chamber. The combustion gases are passed through the outer chamber, and recirculated to the combustion chamber. The process gas is pre-heated by indirect heat exchange with the combustion gases.

17 Claims, 1 Drawing Sheet

(56) References Cited

U.S. PATENT DOCUMENTS

| | | | | |
|---|---|---|---|---|
| 11,766,718 | B2 * | 9/2023 | Woodard | F27B 5/14 419/54 |
| 2007/0054229 | A1 * | 3/2007 | Hanzawa | C04B 38/06 432/266 |
| 2011/0115137 | A1 * | 5/2011 | Sarres | F27B 5/14 266/252 |

FOREIGN PATENT DOCUMENTS

| | | | | |
|---|---|---|---|---|
| DE | 10 2012 009854 | A1 | 11/2012 | |
| DE | 10 2012 221511 | A1 | 6/2014 | |
| EP | 0481136 | A1 | 4/1992 | |
| EP | 2687801 | A1 | 1/2014 | |
| JP | 58055534 | A * | 4/1983 | |
| JP | S58 55534 | A | 4/1983 | |
| JP | S6350405 | B2 * | 10/1988 | |
| JP | 2014114510 | A * | 6/2014 | F27D 99/0033 |

* cited by examiner

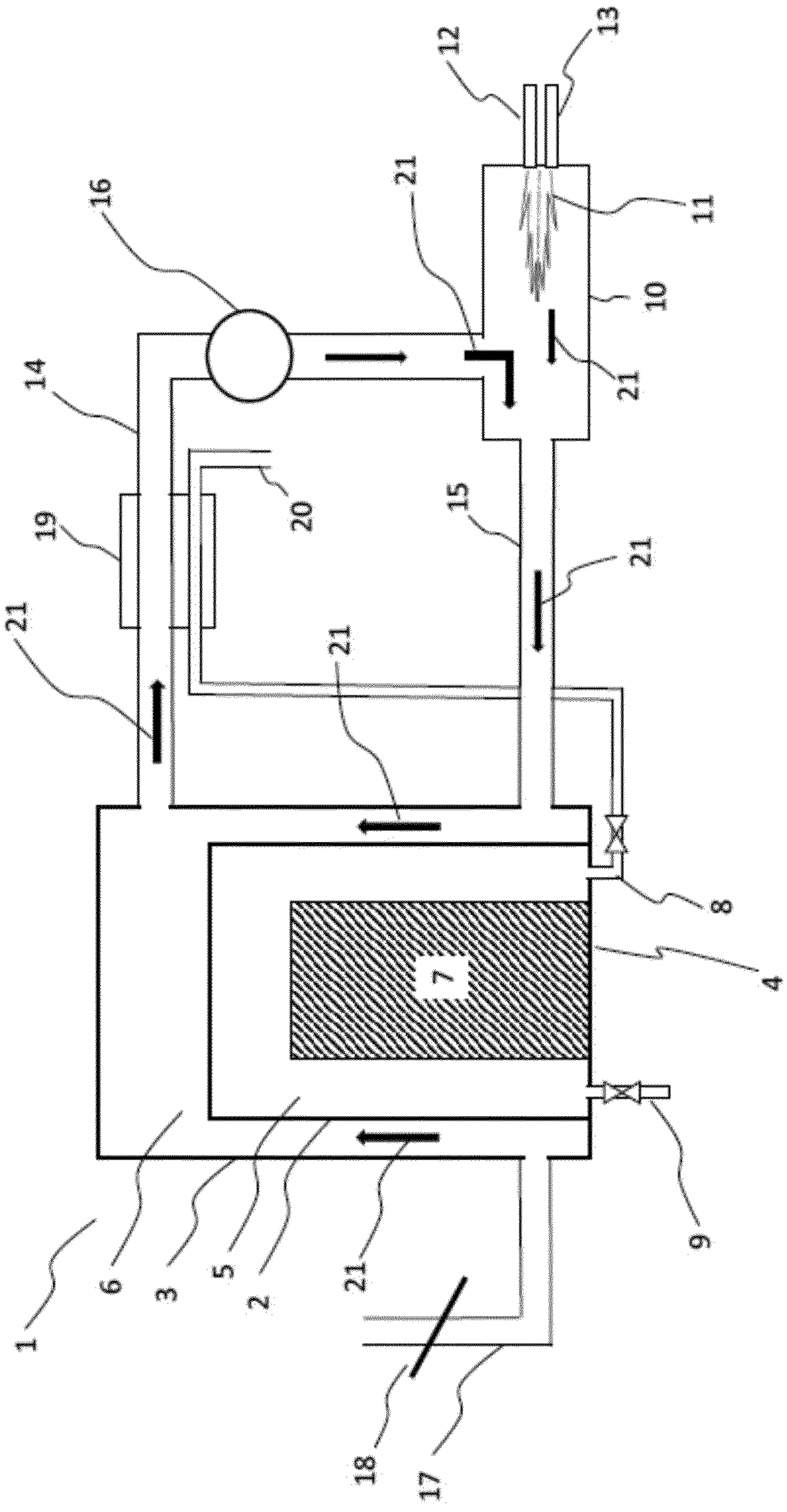
1
2
3
4
5
6
7
8
9
10
11
12
13
14
15
16
17
18
19
20
21

METHOD FOR HEATING A FURNACE

The invention relates to a method for heating a furnace, wherein the furnace comprises an inner chamber and an outer chamber, wherein the outer chamber at least partly surrounds the inner chamber, wherein a fuel is combusted with an oxidant to produce combustion gases, wherein the combustion gases are passed through the outer chamber, and wherein a process gas is introduced into the inner chamber.

Bell furnaces are hood-type furnaces for heat treatment of the goods, for example for annealing coils of metal strips. The bell furnace comprises an inner hood which is placed over the goods to be heat-treated and which defines an inner chamber filled with a process gas atmosphere. An outer hood which is placed over the inner hood is heated electrically or by gas burners. The space between the inner hood and the outer hood defines an outer chamber. The gas burners are placed in the space between the inner and the outer hood or into the wall of the outer hood.

For high quality results it is important to heat the goods as uniform as possible and in particular to avoid any hot spots and to avoid overheating the inner chamber material.

Further, the NOx emissions should be kept low. However, the space between the inner and the outer hood is often small and narrow and conventional low NOx burners cannot operate there.

It is an object of the present invention to provide a method for heating a furnace where only very small and narrow space is available to install conventional burners.

It is an object of the present invention to reduce the NOx emissions generated in heating furnaces, in particular bell-type furnaces.

Another object is to provide a furnace with good temperature uniformity. In particular hot spots and local overheating shall be avoided.

These objects are achieved by a method for heating a furnace, wherein the furnace comprises an inner chamber and an outer chamber, wherein the outer chamber at least partly surrounds the inner chamber, wherein a fuel is combusted with an oxidant to produce combustion gases, wherein the combustion gases are passed through the outer chamber. The invention is characterized in that the fuel is combusted with the oxidant in a combustion chamber which is external to the furnace, in that the combustion gases are recirculated from the outer chamber to the combustion chamber.

The furnace comprises an inner chamber and an outer chamber. The part or the material to be treated or heated is placed in the inner chamber. The inner chamber is filled with a process gas to provide a process atmosphere in the inner chamber. The outer chamber at least partly surrounds the inner chamber. Preferably one or more outer walls of the inner chamber are in direct contact with the inner walls of the outer chamber. More preferred one or more outer walls of the inner chamber serve as inner walls of the outer chamber. It is further preferred that more than 80% of the inner chamber, more than 90% of the inner chamber or the complete inner chamber are located within the outer chamber.

Hot combustion gases are passed through the outer chamber in order to heat the inner chamber and the parts therein. Therefore, the outer chamber and the inner chamber are arranged to have a good or very good heat transfer contact.

In the combustion chamber a fuel is reacted with an oxidant and hot combustion gases are produced. The combustion chamber is separate from or external to the furnace. The combustion chamber is not part of the furnace but connected to the furnace via one or more pipelines. Therefore, the temperature in the combustion chamber need not be the same as in the furnace. For example, it is possible to run the combustion process in the combustion chamber at a high temperature even though the furnace temperature shall be low. By passing more or less combustion gases from the combustion chamber to the outer chamber the furnace temperature can be controlled.

The combustion gases are transferred from the combustion chamber to the outer chamber of the furnace. Part of the heat of the combustion gases is transferred from the combustion gases to the furnace, for example to the furnace walls, to furnace components, to furnace installations and/or to any material within the furnace. The outer chamber is or acts as a direct or indirect heat exchanger.

The combustion gases are then recirculated to the combustion chamber. There is a continuous recirculation of combustion gases from the combustion chamber to the outer chamber of the furnace and back to the combustion chamber. The recirculation could for example be maintained by means of a fan. In the combustion chamber the fuel and the oxidant can be continuously combusted in order to generate a continuous stream of hot combustion or exhaust gases. It is also possible to combust the fuel and the oxidant only when additional heat shall be added to the recirculated combustion gases, for example when the temperature of the recirculated combustion gases re-entering the combustion chamber falls below a certain level.

Furthermore, according to a preferred embodiment of the invention, the heat of the combustion gases is used to preheat a process gas which is introduced into the furnace. The process gas, for example an inert gas, such as nitrogen or argon, or a reducing gas, such as hydrogen, forms a process atmosphere in the inner chamber of the furnace, for example in order to support the heat treatment process in the furnace or to protect the parts to be processed.

The heat treatment process could be annealing, hardening, tempering, carburizing, nitriding, or any other process used to modify the physical properties of a material. The invention may also be used for drying parts in a furnace. The process gas is preferably selected to support the desired heat treatment process. The material is preferably a metallic material, a metal or a metal alloy.

By the inventive recirculation maximum use of the heat of the combustion gases is made with a minimum of NOx production. The fuel consumption as well as NOx and $CO_2$ emissions are decreased compared to prior art combustion-based heating technologies. Further, the temperature uniformity in the furnace is increased. The invention prevents any hot spots or local over-heating which in prior art furnaces with burners located in the outer chamber or in the walls of the outer chamber might occur.

In addition, by preheating the process gas prior to entering the furnace the temperature uniformity is even more improved and it is possible to heat up the furnace and the process atmosphere in the furnace faster compared to conventional systems.

The inventive furnace heating technology can especially be used for heating furnaces where only very small and narrow space is available which does not allow to install conventional burners or where conventional burners cannot operate.

The furnace and/or furnace interiors are heated by heat transfer from the hot combustion gases. The furnace or any parts of the furnace do not come into direct contact with the combustion flames or burner flames and hot spots which could damage the furnace or the parts to be processed in the furnace are avoided. The invention allows to keep the temperature of the furnace within a very narrow temperature profile.

In a preferred embodiment the oxidant comprises at least 30% by volume oxygen, preferably more than 50% by volume oxygen or at least 80% by volume oxygen, preferably more than 90% by volume oxygen, preferably more than 98% by volume oxygen, preferably technical pure oxygen is used as oxidant. With increasing oxygen content the combustion temperature will increase. In combination with low or minimal air in-leakage into the recirculation system NOx formation will be extremely low. Oxyfuel combustion has the further advantage that in contrast to air-fuel combustion, it provides very high partial pressures of $CO_2$ and $H_2O$. Such heated species increase heat transfer due to grey gas radiation.

In a further preferred embodiment the combustion of the fuel and the oxidant is flameless. The combination of flameless oxyfuel combustion or combustion with an oxidant with a high oxygen content and a combustion chamber at high temperatures with minimal air in-leakage will create an optimal situation to avoid NOx formation.

The fuel and the oxidant are combusted in the combustion chamber which is separate and external from the furnace. By having the fuel-oxidant-combustion in a separate combustion chamber with high temperature it is possible to run the combustion in a flameless low NOx mode even though the temperature in the main process, that is in the furnace, is low.

The fuel and the oxidant are usually reacted in or by a burner. The term "combusting the fuel and the oxidant" shall cover any type of combustion, in or with a conventional burner or in or with any other suitable device. For example, the burner could be an external mixing burner, a pre-mixing burner or the fuel and the oxidant might be injected or introduced into the combustion chamber as separate gas streams and then they react within the combustion chamber.

The combustion gases are preferably recirculated by means of a fan. Depending on the temperature resistance of the fan the combustion gases can also be cooled upstream of the fan.

When more heat input and a higher temperature is needed in the furnace, the combustion in the combustion chamber can be increased to produce more and/or hotter combustion gases. In this case it might be that the returning flow of used combustion gases from the furnace back to the combustion chamber gets too hot for the fan. The cooling of the combustion gases upstream of the fan will then enable such "boosting" for periods of time.

According to another preferred embodiment the oxidant and/or fuel are preheated by indirect heat exchange with the recirculated combustion gases. Such preheating will improve the combustion of the fuel and the oxidant. The combustion temperature will be very high and the NOx generation suppressed.

The combustion gases are recirculated from the combustion chamber to the outer chamber and back to the combustion chamber. The pressure of the recirculated combustion gases is preferably controlled by withdrawing a part of the combustion gases from the recirculated combustion gas stream. The recirculation pipeline could for example be provided with a damper which opens when the pressure exceeds a certain limit.

When the temperature of the recirculated combustion gases is higher than a maximum temperature it is possible to withdraw part of the recirculated combustion gases from the recirculation line. The flow of the remaining combustion gases is thereby lowered and it will be cooled down to lower temperatures in the outer chamber.

The combustion gases are preferably introduced into the outer chamber at two or more inlet openings. Thereby, the combustion gases will be distributed more uniform in the outer chamber and a more uniform heating is achieved.

The invention can be used for many kinds of furnaces and heat treatment processes, and in particular for heating furnaces with small air in-leakage. In a preferred embodiment the furnace is a bell furnace with a base, an inner hood and an outer hood wherein the base and the inner hood define the inner chamber and wherein the base, the inner hood and the outer hood define the outer chamber. The combustion gases are passed from the combustion chamber into the space between the outer hood and the inner hood and heat the furnace.

According to another embodiment of the invention, the outer chamber consists of or comprises radiant tubes. The hot combustion gases are passed through one or more radiant tubes to create a uniform heating inside the tubes and also allowing the use of low NOx flameless oxyfuel for this purpose. The combustion gases leaving the tubes are returned to the combustion chamber.

The invention as well as further details of the invention shall be explained with reference to FIG. 1 which shows a bell furnace heated according to the invention.

FIG. 1 shows a bell furnace 1 which comprises an inner hood 2, an outer hood 3 and a base 4. The base 4 and the inner hood 2 form an inner chamber 5. A part 7 to be heat-treated, for example a coil of metal strip, is placed in the inner chamber 5. The goods or parts 7 may be annealed or subjected to another heat treatment process, preferably in a defined process atmosphere. Therefore, the inner chamber 5 is provided with a process gas inlet 8 and a process gas outlet 9. A process gas, for example an inert gas such as nitrogen, is introduced into the inner chamber 5 via process gas inlet 8 in order to generate inside the inner chamber 5 a defined process gas atmosphere with a defined pressure and composition.

The space between the inner hood 2 and the outer hood 3 is used as outer chamber 6. By passing a hot gas through the outer chamber 6 the inner chamber 5 can be indirectly heated.

A combustion chamber 10 is provided with a burner 11 which is supplied with a fuel 12 and an oxidant 13. The oxidant 13 has preferably an oxygen content of at least 80% by volume or at least 90% by volume. In a preferred embodiment the burner 11 is an oxy-fuel burner and the oxidant is technically pure oxygen.

The combustion chamber 10 is separate from and external to the furnace 1. The combustion chamber 10 is connected with the outer chamber 6 by means of a pipeline 14 and a pipeline 15. The hot combustion gases produced by the burner 11 can be circulated from the combustion chamber 10 through pipeline 15 into the outer chamber 6 and then recirculated via pipeline 14 to the combustion chamber 10. A pump, a fan or a compressor 16 is provided in the pipeline 14 to circulate the combustion gases through the recirculation circuit 15, 6, 14, 10. The pressure of the recirculated combustion gases is preferably controlled by withdrawing a part of the combustion gases from the outer chamber 6. The outer chamber 6 is provided with an outlet 17 and a damper 18 which opens when the pressure exceeds a certain limit.

The pipeline 14 is further provided with a heat exchanger 19. A process gas supply line is passed through the heat exchanger 19 and connected to the process gas inlet 8.

In operation a fuel 12 and an oxidant 13, in particular pure oxygen, are reacted in the burner 11 to generate combustion gases 21. The hot combustion gases 21 are then passed through the outer chamber 6, through the heat exchanger 19 and recirculated back to the combustion chamber 10.

In the outer chamber 6 the combustion gases 21 are in heat exchange with the inner hood 2 and indirectly with the process gas atmosphere in the inner chamber 5. The process gas atmosphere in the inner chamber 5 is heated by the combustion gases 21 to a pre-defined temperature. The pump, fan or compressor 16 circulates the combustion gases 21 through the recirculation cycle 10, 15, 6, 14.

The hot combustion gases 21 are passed from the outer chamber 6 through the heat exchanger 19. Within the heat exchanger 19 the combustion gases 21 are in indirect heat exchange with the process gas which is passed through the process gas supply line 20 and introduced into the inner chamber 5. Thereby, during start-up of the heat treatment process it is possible to speed up the temperature increase in the inner chamber 5 and during the heat treatment process any process gas entering the inner chamber 5 is already pre-heated so that the temperature uniformity in the inner chamber 5 is increased.

The burner 11 operates continuously at a low rate in order to add a small amount of hot combustion gases to the recirculated combustion gases 21 so that the temperature of the combustion gases 21 remains within the desired range. It is also possible to operate the burner 11 intermittently and to combust the fuel 12 and the oxidant 13 only when the temperature of the recirculated combustion gases has fallen below a certain level and when additional heat shall be added to the recirculated combustion gases 21.

The invention claimed is:

1. A method for heating a furnace having an inner chamber and an outer chamber, wherein the outer chamber at least partly surrounds the inner chamber, the method comprising:

combusting a fuel with an oxidant to produce combustion gases, and passing the combustion gases through the outer chamber, wherein the fuel is combusted with the oxidant in a combustion chamber which is external to the furnace and wherein the combustion gases are recirculated from the outer chamber to the combustion chamber.

2. The method according to claim 1, wherein a process gas is introduced into the inner chamber and that the process gas is pre-heated by indirect heat exchange with the combustion gases.

3. The method according to claim 2, wherein the process gas is an inert gas or a reducing gas.

4. The method according to claim 3, wherein the process gas is nitrogen, argon, or hydrogen.

5. The method according to claim 1, wherein the oxidant comprises at least 30% by volume oxygen.

6. The method according to claim 1, wherein the combustion of the fuel and the oxidant is flameless.

7. The method according to claim 1, wherein the combustion gases are recirculated by means of a fan.

8. The method according to claim 7, wherein the combustion gases are cooled upstream of the fan.

9. The method according to claim 1, wherein the fuel and/or the oxidant are pre-heated in indirect heat exchange with the combustion gases.

10. The method according to claim 1, wherein the pressure of the recirculated combustion gases is controlled by withdrawing a part of the combustion gases from the recirculated combustion gas stream.

11. The method according to claim 1, wherein the temperature of the recirculated combustion gases is controlled by adding combustion gases in the combustion chamber.

12. The method according to claim 1, wherein the outer chamber has two or more inlet openings and that the combustion gases are distributed to at least two of the inlet openings.

13. The method according to claim 1, wherein the furnace is a bell furnace with a base, an inner hood and an outer hood and wherein the base and the inner hood define the inner chamber and wherein the base and the outer hood define the outer chamber.

14. The method according to claim 1, wherein the fuel is continuously combusted with the oxidant.

15. The method according to claim 1, wherein the oxidant comprises at least 50% by volume oxygen.

16. The method according to claim 1, wherein the oxidant comprises at least 80% by volume oxygen.

17. The method according to claim 1, wherein the fuel and the oxidant are intermittently combusted with each other.

* * * * *